May 31, 1938. J. CALVY 2,119,151
FRICTION BEARING FOR AIRCRAFT CONTROL SURFACES
Filed Nov. 7, 1936
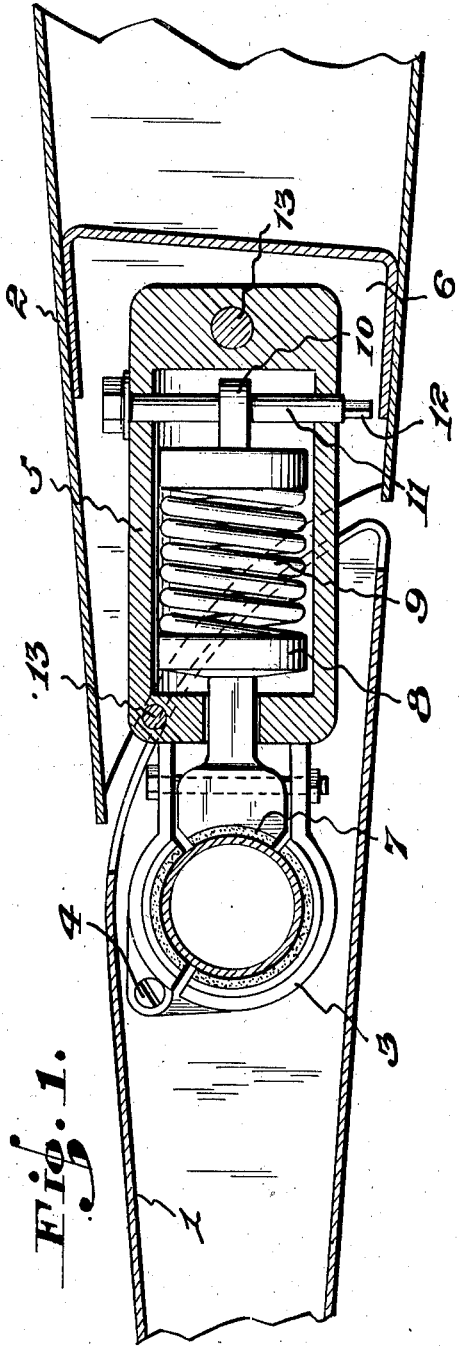
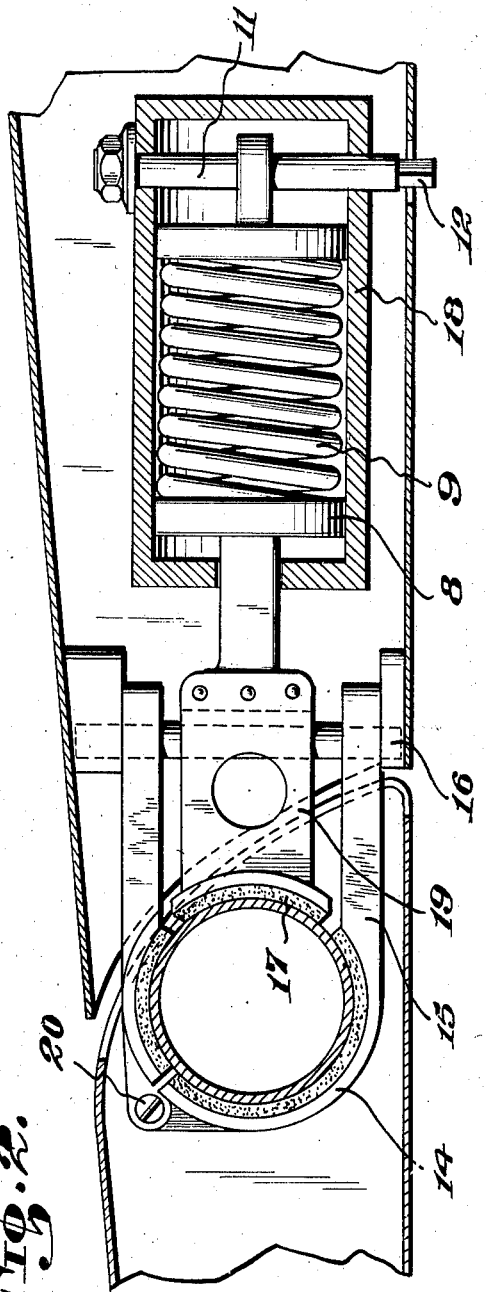
INVENTOR.
J. Calvy
BY:
Glascock Downing Seebold
Attys.

Patented May 31, 1938

2,119,151

UNITED STATES PATENT OFFICE 2,119,151

FRICTION BEARING FOR AIRCRAFT CONTROL SURFACES

Jean Calvy, Paris, France

Application November 7, 1936, Serial No. 109,786

6 Claims. (Cl. 244—87)

The present invention relates to friction bearings for the axles of aircraft control surfaces and it is especially, although not exclusively concerned with friction bearings for airplane ailerons, the term "friction bearing" designating a bearing adapted to be employed either as the sole support of the control surface or in combination with other bearings and capable of exerting by friction a braking action upon the axle or spindle journalled therein.

The object of the present invention is to provide a bearing of this kind which is better adapted to meet the requirements of actual practice than bearings used for the same purpose up to this time, and in particular a bearing which is wholly enclosed in the structure by which it is carried.

According to the essential feature of the present invention, the annular bearing structure surrounding the control surface axle journalled therein is provided, on the side adjoining the fixed part of the aircraft which carries said control surfaces (for instance the wing in the case of a friction bearing for an aileron) with an aperture in which is mounted a shoe movable radially with respect to the axis of the bearing so as to exert the desired friction action, the means for urging this shoe against said axle forming an elongated structure extending in the direction of the displacement of said shoe and being mounted in said fixed part in such manner as not to project outwardly from said fixed part.

Other features of the present invention will result from the following detailed description of some specific embodiments thereof.

Preferred embodiments of the present invention will be hereinafter described with reference to the accompanying drawing, given merely by way of example, and in which:

Fig. 1 is a vertical sectional view at right angles to the axis of a bearing made according to the present invention;

Fig. 2 is a view similar to Fig. 1, corresponding to another embodiment.

In the drawing, the invention is supposed to be applied to the case of a control surface pivotally carried by an airplane wing. The wing is diagrammatically shown at 2 and the control surface at 1.

In the embodiment of Fig. 1, the fixed part of the bearing is constituted by two jaws such as 3 pivoted together at 4. Both of these jaws 3 are rigidly fixed (for instance by means of bolts) to a casing 5, fixed by means of bolts 13 to the wing proper 2 inside a housing 6 of said wing.

As is visible in the drawing, jaws 3 leave between them, on the side nearer to the wing, a space in which is fitted a radially movable shoe 7 which constitutes the friction element intended to be applied against the shaft of the control surface with the desired pressure. This pressure is exerted by a piston 8, rigid with shoe 7 and movable inside casing 5, said piston being subjected to the action of a spring 9 interposed between said piston 8 and an adjustable cam 10. In order to permit of adjusting the position of said cam, the spindle 11 on which it is keyed can be turned by means of a portion 12 of square section.

It will be noted that the control surface 1 of Fig. 1 is of the balanced type. With the arrangement shown in this figure, when surface 1 is given its maximum angular displacement in the clockwise direction, the part thereof located ahead of the pivot uncovers the rear opening of housing 6 so that it is possible to reach both square portion 12 and bolts 13.

Figure 2 discloses an embodiment adapted to be used, for instance, in connection with a non-balanced control surface.

The general arrangement of this embodiment is the same as that above described. The jaws 14 of the fixed part of the bearing are pivoted to each other at 20. These jaws are fixed through parts 15 to the fixed structure, or wing proper, through bolts 16. The radially movable friction shoe 17 is fixed to an element 19 carried by the rod of piston 8. As in the preceding example, said piston is subjected to the action of a spring 9 interposed between said piston and a cam carried by a pin 11, journalled in a separate casing 18 fixed in the wing structure.

Of course, piece 19 is provided with a hollow in its middle part for the passage of bolt 16 in the course of the radial displacements of said piece 19.

Bolts 16 and square-shaped portion 12 can be acted upon through apertures provided in the wing covering.

It should be noted that, in both of the embodiments above described, the friction bearing is wholly inclosed inside wing 2 and control surface 1, while it is very easy to reach the parts, such as 12, 13, 16, through which the device can be adjusted or fixed.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. In an aircraft including a fixed part and a control surface having an axle to be journalled with respect to said part, a friction bearing for said axle which comprises, in combination, an annular bearing portion, rigidly connected to said fixed part, provided with a gap on the side thereof nearer to said fixed part, a friction shoe movable radially in said gap, and means for elastically urging said shoe toward the axis of said annular bearing portion, said means forming a system of elongated shape in the direction of movement of said shoe and being wholly inclosed in said fixed part and said control surface.

2. In an aircraft including a fixed part and a control surface having an axle to be journalled with respect to said part, a friction bearing for said axle which comprises, in combination, an annular bearing portion, rigidly connected to said fixed part, provided with a gap on the side thereof closer to said fixed part, a friction shoe movable radially in said gap, and means for elastically urging said shoe toward the axis of said fixed part, said means including a casing of elongated shape in the direction of movement of said shoe rigidly secured to said fixed part of the aircraft and wholly inclosed therein, a piston slidable in said casing rigidly assembled to said shoe, and a spring interposed between said piston and one end of said casing, said annular bearing portion being disposed between the upper and under faces of said control surface.

3. In an aircraft including a fixed part and a balanced control surface having an axle to be journalled with respect to said part, a friction bearing for said axle which comprises, in combination, an annular bearing portion, positioned inside the vertical outline of said control surface, provided with a gap on the side thereof closer to said fixed part, a friction shoe movable radially in said gap, a casing rigid with said annular bearing portion, of elongated shape in the direction of movement of said shoe, said casing being rigidly secured to said fixed part of the aircraft and wholly inclosed therein, a piston, slidable in said casing, rigid with said shoe, and a spring interposed between said piston and one end of said casing for elastically urging said shoe toward the axis of said annular bearing portion.

4. A friction bearing according to claim 3, including means for directly fixing said casing to said fixed part of the aircraft and means for adjusting the action of said spring, said two last mentioned means being so arranged as to be accessible when said control surface is fully pivoted in one direction.

5. In an aircraft including a fixed part and a control surface having an axle to be journalled with respect to said part, said control surface being aerodynamically unbalanced, a friction bearing for said axle which comprises, in combination, an annular bearing portion directly secured in a rigid manner to said fixed part of the aircraft, said annular bearing portion being provided with a gap on the side thereof closer to said fixed part, a friction shoe movable radially in said gap, a casing of elongated shape in the direction of movement of said shoe, directly secured in a rigid manner to said fixed part of the airplane and wholly inclosed therein, a piston slidable in said casing rigid with said shoe, and a spring interposed between said piston and one end of said casing for elastically urging said shoe toward the axis of said annular bearing portion, said annular bearing portion being disposed between the upper and under faces of said control surface.

6. A friction bearing according to claim 5 further including means for adjusting the action of said spring, said adjusting means being accessible through at least one of the faces of said fixed part of the aircraft.

JEAN CALVY.